United States Patent [19]

Simmons et al.

[11] Patent Number: 5,824,199

[45] Date of Patent: Oct. 20, 1998

[54] ELECTROCHEMICAL CELL HAVING AN INFLATABLE MEMBER

[75] Inventors: Walter John Simmons, Martinsburg, W. Va.; Clarence Garlan Law, Jr., West Trenton, N.J.; James Arthur Trainham, III, Greenville, Del.; John Scott Newman, Kensington, Calif.

[73] Assignee: E. I. du Pont de Nemours and Company, Wilmington, Del.

[21] Appl. No.: 951,787

[22] Filed: Oct. 17, 1997

Related U.S. Application Data

[63] Continuation of Ser. No. 432,343, May 1, 1995, abandoned, which is a continuation-in-part of Ser. No. 156,196, Nov. 22, 1993, Pat. No. 5,411,641, and Ser. No. 246,909, May 20, 1994, Pat. No. 5,580,437, which is a continuation-in-part of Ser. No. 156,196.

[51] Int. Cl.$^6$ .............................. C25B 9/04; C25B 11/06; C25B 11/20

[52] U.S. Cl. ........................ 204/262; 204/265; 204/263; 204/266; 204/290 R; 204/290 F; 204/291; 204/292; 204/293; 204/294; 204/296

[58] Field of Search ..................... 204/256, 258, 204/265, 279, 262, 263, 266, 290 R, 290 F, 291, 292, 293, 294, 296

[56] References Cited

U.S. PATENT DOCUMENTS

| | | | |
|---|---|---|---|
| 3,453,187 | 7/1969 | Slatin | 204/69 |
| 3,536,603 | 10/1970 | Bonga | 204/297 R X |
| 3,729,395 | 4/1973 | Caron et al. | 204/59 R |
| 3,835,017 | 9/1974 | Mentone et al. | 204/224 R |
| 4,169,025 | 9/1979 | Needes | 204/98 |
| 4,191,618 | 3/1980 | Coker et al. | 204/98 |
| 4,210,501 | 7/1980 | Dempsey et al. | 204/128 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,605,483 | 8/1986 | Michaelson | 204/224 R X |
| 4,898,653 | 2/1990 | Morris | 204/265 X |
| 4,959,132 | 9/1990 | Fedkiw, Jr. | 204/101 |
| 5,223,102 | 6/1993 | Fedkiw, Jr. et al. | 204/78 |
| 5,458,755 | 10/1995 | Fujiyama et al. | 204/265 X |

FOREIGN PATENT DOCUMENTS

| | | |
|---|---|---|
| 1 179 631 | 12/1984 | Canada . |
| 1 195 949 | 10/1985 | Canada . |
| 319 489 | 6/1989 | European Pat. Off. ........ C25B 11/16 |
| 0 575 178 A1 | 12/1993 | European Pat. Off. ........ H01M 8/24 |
| 2 413 481 | 7/1979 | France .............................. C25B 9/00 |
| 1 930 116 | 5/1970 | Germany . |
| 56-36873 | 8/1981 | Japan . |
| WO 95/14797 | 6/1995 | WIPO .............................. C25B 1/24 |

OTHER PUBLICATIONS

Appleby, A. J. et al., *Fuel Cell Handbook*, Van Nostrand Reinhold, New York, Chapter 10, pp. 284–312., (no date).

Jewulski, J.R. et al., *Solid–State Proton Conductors—Final Report*, For U.S. DOE, Office of Fossil Energy, Morgantown Energy Tech. Center, Morgantown, WV, Institute of Gas Technology, Chicago, Illinois, Dec., 1990.

Minz, F.R., "HCl–Electrolysis–Technology for Recycling Chlorine,", Bayer AG, Conference on Electrochemical Processing, Innovation & Progress, Glasgow, Scotland, UK Apr. 21–23, 1993.

*Primary Examiner*—Donald R. Valentine

[57] ABSTRACT

A conductive inflatable member is provided in an electrochemical cell between an electrode and a current for providing uniform contact pressure, and thus uniform electrical contact between the electrode and the current bus. The inflatable member may comprise a pair of flexible plates, where one plate is thinner than the other plate. The cell of the present invention is particularly useful in converting anhydrous hydrogen halide directly to essentially dry halogen gas, such as anhydrous hydrogen chloride to dry chlorine gas, or in converting aqueous hydrogen halide, such as aqueous hydrogen chloride, to wet chlorine gas.

38 Claims, 5 Drawing Sheets

ELECTROCHEMICAL CELL HAVING AN INFLATABLE MEMBER

This application is a continuation of U.S. application Ser. No. 08/432,343, filed May 1, 1995, now abandoned which is a continuation-in-part of U.S. application Ser. No. 08/156,196, filed Nov. 22, 1993, now U.S. Pat. No. 5,411,641, issued May 2, 1995, and of U.S. application Ser. No. 08/246,909, filed May 20, 1994, now U.S. Pat. No. 5,580,437, issued Dec. 3, 1996, which is a continuation-in-part of U.S. application Ser. No. 08/156,196.

BACKGROUND OF THE INVENTION

1. Field of the Invention

The present invention relates to an electrochemical cell having an inflatable member which provides uniform contact pressure and thus uniform electrical contact between the components of the cell. In particular, the inflatable member is useful in a cell for converting anhydrous hydrogen halide, in particular, hydrogen chloride, hydrogen fluoride, hydrogen bromide and hydrogen iodide, to a dry halogen gas, such as chlorine, fluorine, bromine, or iodine. In addition, the inflatable member may be used in an electrochemical cell which converts an aqueous reactant to an aqueous product.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

where the following catalysts may be used, depending on the reaction or process in which equation (1) is used.

| Catalyst | Reaction or Process |
| --- | --- |
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electro-chemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

Further, the presence of water in the Uhde system limits the current densities at which the cells can perform to less than 500 amps./ft.$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

To obtain maximum efficiency from an electro-chemical cell it is very important to keep all of the components in uniform contact with each other. This is very easy to accomplish in a laboratory-size cell, which is typically 100 to 500 $cm^2$ in size. However, on commercial cells that are typically 1 to 2 $m^2$, it is very difficult to keep the cell components intimately in contact with each other. This is due to variations in thickness of the various components, warpage of the components, and deflection of the components when subjected to internal pressure. With time, some of the internal components may erode or corrode and change in thickness. As the thickness is reduced, the contact pressure is reduced, and electrical resistance increases. This results in lowering the efficiency of the cell. It is desirable to provide a means to keep all of the components of the cell uniformly pressed together. In addition, it is desirable for uniform pressure between the components to be maintained with temperature variations and with time as the internal components erode or corrode.

Numerous methods have been employed to attempt to maintain uniform pressure on the components. For example, to overcome deflection of the end plates of the cell with internal pressure, very thick plates may be used. This is expensive and will not compensate for any variations of the other components of the cell. Plates with numerous springs are often used to keep the components in intimate contact. While springs accomplish their immediate goal of keeping the components in intimate contact, they have serious deficiencies. They will not compensate for variations in operating pressure. For example, if a cell is designed to operate at 50 psig and the cell pressure is increased to 100 psig, the springs will compress, and the contact pressures of the internal components will decrease by 50 psig. The only way to increase the pressure is to dismantle the cell and reassemble it with heavier springs.

In addition, cooling of an electrochemical cell is a problem. One alternative is to use additional flow of fluid on the cathode or the anode. If, for example, additional water is used on the cathode to remove heat, the water becomes contaminated with HCl, and consequently, heat exchangers used in HCl environments must be designed for special servicing. This is expensive, and, in addition results in large quantities of contaminated water that must be treated or disposed.

An expandable bladder in a fuel cell is disclosed in U.S. Pat. Nos. 4,389,466 and 4,560,626 to Joy. In the former patent, the bladder applies a constant pressure to anodes, urging them out of a recess in the cell. In the latter patent, the bladder urges cathode supports toward one another and tightly clamps the cathodes against the current collectors, which, in turn, are tightly engaged with the opposite surfaces of the anode.

SUMMARY OF THE INVENTION

The present invention solves the problems of the prior art by providing an electrochemical cell for directly producing essentially dry halogen gas from essentially anhydrous hydrogen halide. This process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electro-chemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

Moreover, the present invention solves the problems of the prior art by providing an electro-chemical cell having an inflatable member which maintains uniform pressure over very large areas, even with variations in thickness of the components of the cell. Tolerances in fabrication of the components of the cell can be increased, thus reducing the cost of the cell. The inflatable member also automatically compensates for changes in thickness of the internal components of the cell with time. Thus, with the present invention, higher current densities can be run over the life of the cell.

In addition, the pressure of the inflatable member is easily adjustable. Thus, if the operating pressure of the cell of the present invention is increased from 50 psig to 100 psig, the contact pressure between the components can be kept the same by increasing the pressure in the inflatable member, say by 50 psig.

Another advantage of the present invention is that the pressure of the inflatable member can be varied while the cell is operating, so that optimum cell performance can be obtained. Moreover, it is possible with the present invention to use a control loop that varies the pressure of the inflatable member in response to voltage drop, flow rates through the cell, internal pressure of the cell, or the temperature of the cell.

In addition, the inflatable member of the present invention can be used to remove heat from the cell. The fluid path for the inflatable member is totally sealed from the chemical reactants and products of the cell. Thus, a low cost cooling fluid (water is usually preferred) can be used to remove heat from the cell. With the inflatable member of the present invention, pure water or another heat transfer fluid may be employed. Heat exchangers can be low in cost, and disposal and/or treatment of large quantities of heat transfer fluid are eliminated. In addition, the cooling flow is independent of the chemistry of the reactants and products, which may be aggressive. Anode flow and cathode flow can be optimum for the chemical balance desired, and the temperature of the cell can be controlled at any desired level by the flow and the temperature of the fluid in the inflatable member.

The foregoing advantages of the inflatable member can be realized in an electrolytic cell which processes an aqueous reactant. In addition, the foregoing advantages make the anhydrous process of the present invention even more practicable and economically attractive.

To achieve the foregoing solutions, and in accordance with the purposes of the invention as embodied and broadly described herein, there is provided an electrochemical cell comprising an electrode; a membrane disposed in contact with one side of the electrode; a current bus for conducting current to the electrode, wherein the current bus is disposed on the other side of the electrode; and a conductive inflatable member disposed between the electrode and the current bus, wherein the conductive inflatable member provides uniform electrical contact between the membrane and the current bus.

In a preferred embodiment of the present invention, there is provided an electrochemical cell for directly producing essentially dry halogen gas from essentially anhydrous hydrogen halide, comprising means for oxidizing molecules of essentially anhydrous hydrogen halide to produce essentially dry halogen gas and protons; cation-transporting means for transporting the protons therethrough, wherein one side of the cation-transporting means is disposed in contact with one side of the oxidizing means; means for reducing the transported protons, wherein the other side of the cation-transporting means is disposed in contact with the reducing means; a current bus disposed on the other side of the oxidizing means for conducting current to the oxidizing means; and inflatable means disposed between the oxidizing means and the current bus for providing uniform electrical contact between the oxidizing means and the current bus.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention may use anhydrous hydrogen chloride as a reactant and directly produce essentially dry chlorine gas, which will be referred to as the anhydrous case. The term "direct" means that the electrochemical cell obviates the need to remove water from the halogen gas produced or the need to convert essentially anhydrous hydrogen halide to aqueous hydrogen halide before electrochemical treatment. The cell of the present invention will be described as using hydrogen chloride as a reactant to produce chlorine gas, in either the anhydrous or the aqueous case. This cell may alternatively be used to produce other halogen gases, such as bromine, fluorine and iodine from a respective anhydrous hydrogen halide, such as hydrogen bromide, hydrogen fluoride and hydrogen iodide. However, hydrogen fluoride may be particularly corrosive when used with the present invention. In a first embodiment of the present invention, hydrogen, as well as chlorine gas, is produced in this cell, as will be described more fully below. In a second embodiment, water, as well as chlorine gas, is produced by this cell, as will be described more fully below.

Figure 1:
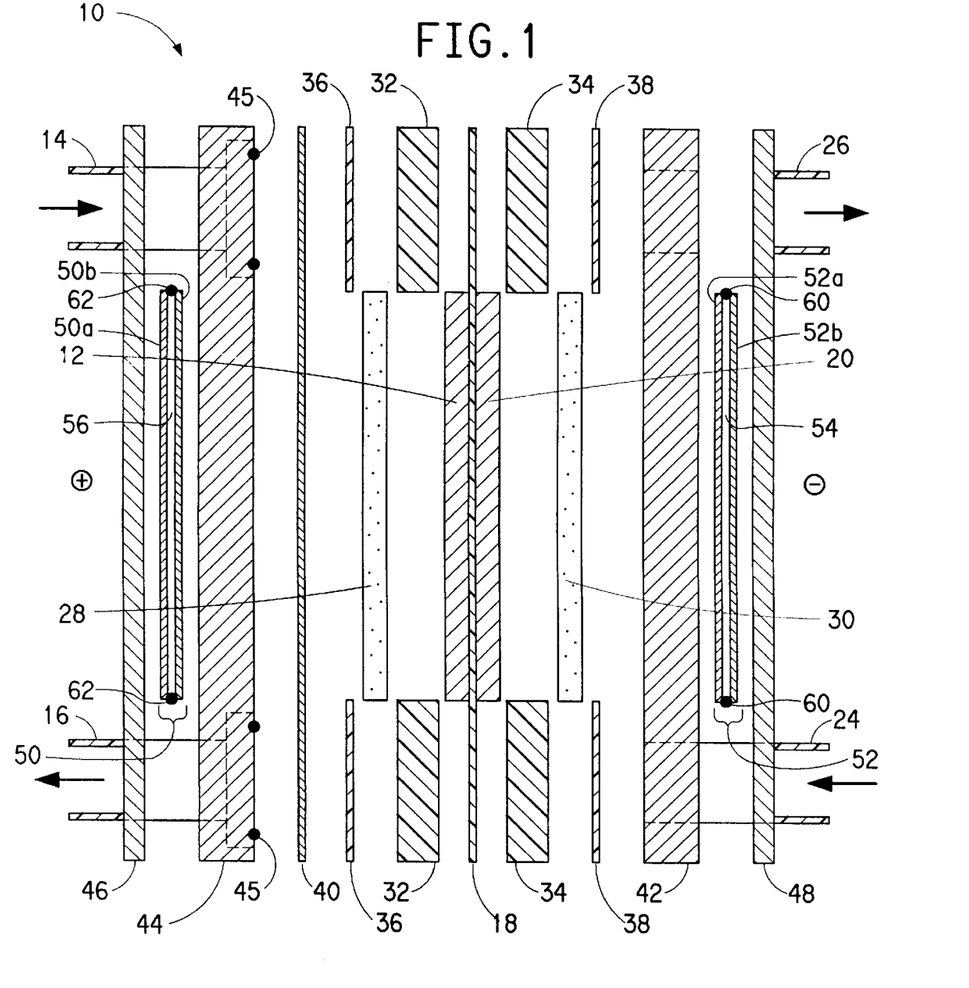
FIG. 1 is an exploded, cross-sectional view of an electrochemical cell for producing halogen gas from anhydrous hydrogen halide according to a first and second embodiment of the present invention.
Figure 5:
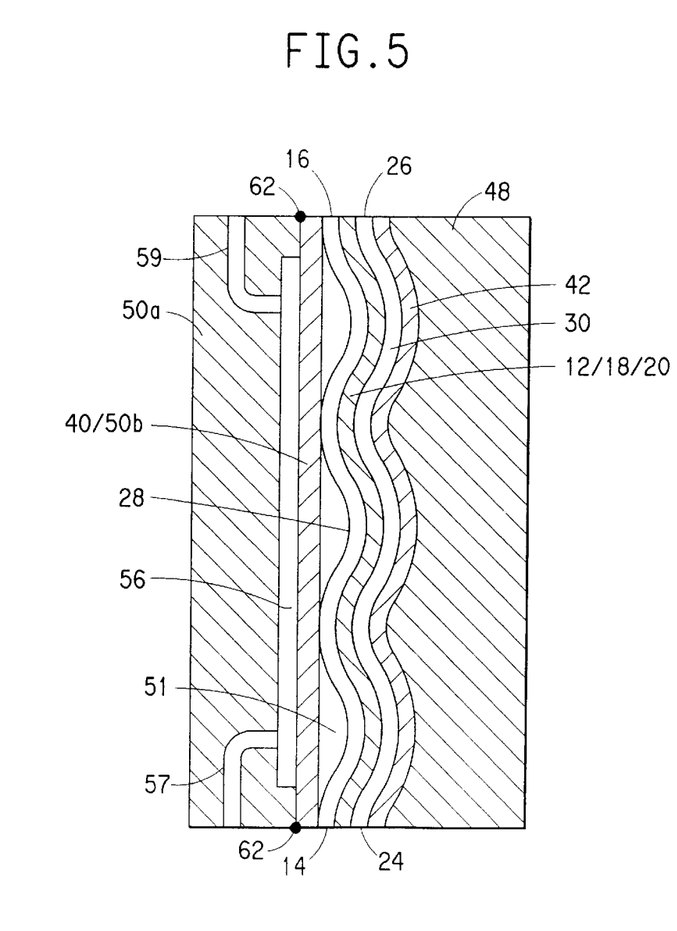
FIG. 5 is a cross-sectional view of a portion of a cell according to the present invention and similar to that shown in FIG. 1, but where the anode-side inflatable member is integrally formed with the anode-side current distributor, and illustrating in particular the anode-side inflatable member before it is inflated.
Figure 6:
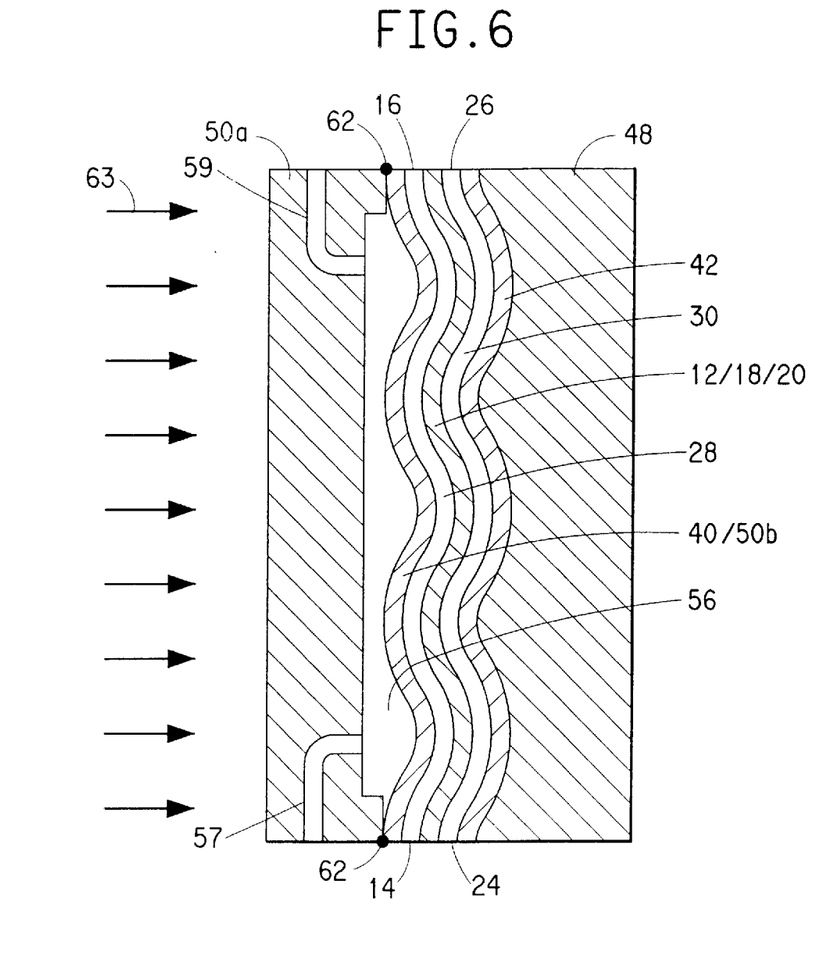
FIG. 6 is a cross-sectional view of the portion of the cell, and in particular, the inflatable member of the present invention as shown in FIG. 5, illustrating a pressure profile when the inflatable member is inflated.

The electrochemical cell of the first and second embodiments comprises an electrode, or more specifically, an anode. Alternatively, the electrochemical cell of the first and second embodiments may be described as comprising means for oxidizing molecules of essentially anhydrous hydrogen halide to produce essentially dry halogen gas and protons. The oxidizing means comprises an anode. An anode 12 is shown in FIGS. 1, 1A, 2, 3, 5, and 6. On the anode side, electrochemical cell 10 has an inlet 14 and an outlet 16 as shown in FIGS. 1, 5, and 6. Since in the preferred embodiment, anhydrous HCl is carried through the inlet, and chlorine gas is carried through the outlet, the inlet and the outlet may be lined with a copolymer of tetrafluoroethylene with (perfluoro)alkyl-vinyl ether, sold under the trademark "TEFLON® PFA" (hereinafter referred to as ("PFA") by E. I. du Pont de Nemours and Company of Wilmington, Del. (hereinafter referred to as "DuPont").

The electrochemical cell of the first and second embodiments also comprises a membrane disposed in contact with one side of the electrode. Alternatively, the electrochemical cell of the first and second embodiments may be described as comprising cation-transporting means for transporting the protons therethrough, where one side of the oxidizing means is disposed in contact with one side of the cation-transporting means. Preferably, the cation-transporting means is a cation-transporting membrane 18 as shown in FIGS. 1, 1A, 2, 3, 5 and 6, where one side of membrane 18 is disposed in contact with one side of anode 12. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —$CF_2CFRSO_3H$ and —$OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2$=$CFOCF_2CF(CF_3)OCF_2CF_2SO_3H$. Sometimes, those resins may be in the form that has pendant —$SO_2F$ groups, rather than —$SO_3H$ groups. The sulfonyl fluoride groups can be hydrolyzed with potassium hydroxide to —$SO_3K$ groups, which then are exchanged with an acid to —$SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as "NAFION®"). In particular, NAFION® membranes containing pendant sulfonic acid groups include NAFION®

117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 $\mu$m-thick membrane having an equivalent weight of 1100 g., and a 25 $\mu$m-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x.Al_2O_3$, in which x ranges from 5 ($\beta''$-alumina) to 11 ($\beta$-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill. December, 1990.

The electrochemical cell of the first and second embodiments also comprises an electrode, or more specifically, a cathode. Alternatively, the electrochemical cell of the first and second embodiments may be described as comprising means for reducing the transported protons, where the reducing means is disposed in contact with the other side of the cation-transporting means. The reducing means comprises a cathode. A cathode 20 is shown in FIGS. 1, 1A, 2, 3, 5 and 6 disposed in contact with the other side (as opposed to the side which is in contact with the anode) of membrane. A complete anode/membrane/cathode structure is shown at 12/18/20 in FIGS. 2, 3, 5 and 6. On the cathode side, electrochemical cell 10 has an inlet 24 and an outlet 26 as shown in FIGS. 1, 5 and 6. Since in the preferred embodiment, anhydrous HCl is processed, and since some chlorides pass through the membrane and consequently, HCl is present on the cathode-side of the cell, the cathode inlet and the outlet may also be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen chloride are transported to the surface of the anode through inlet 14. The molecules of the anhydrous hydrogen chloride are oxidized to produce essentially dry chlorine gas and protons. The essentially dry chlorine gas exits through outlet 16 as shown in FIG. 1. The protons, $H^+$, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores. In one preferred embodiment, the anode, cathode and membrane are a membrane electrode assembly, or MEA, where the anode and the cathode are graphite paper with a ruthenium oxide catalyst material bonded to both sides of a NAFION®) membrane.

In a hot-pressed electrode, the electrochemically active material may comprise a catalyst material on a support material. The support material may comprise particles of carbon and particles of polytetrafluoroethylene, or PTFE, a tetrafluoroethylene fluoropolymer which is sold under the trademark "TEFLONCR®" (hereinafter referred to as "PTFE"), commercially available from DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28-30, 1992, where the inks contain solubilized NAFION® to enhance the catalyst-ionomer surface contact and to act as a binder to the NAFION® perfluorinated membrane sheet. With such a system, loadings as low as 0.017 mg active material per cm$^2$ have been achieved.

Figure 1A:
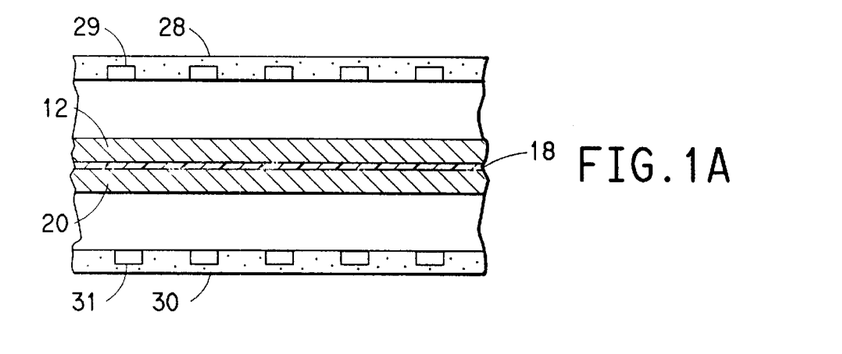
FIG. 1A is a cut-away, top cross-sectional view of the anode and cathode mass flow fields as shown in FIG. 1.
Figure 2:
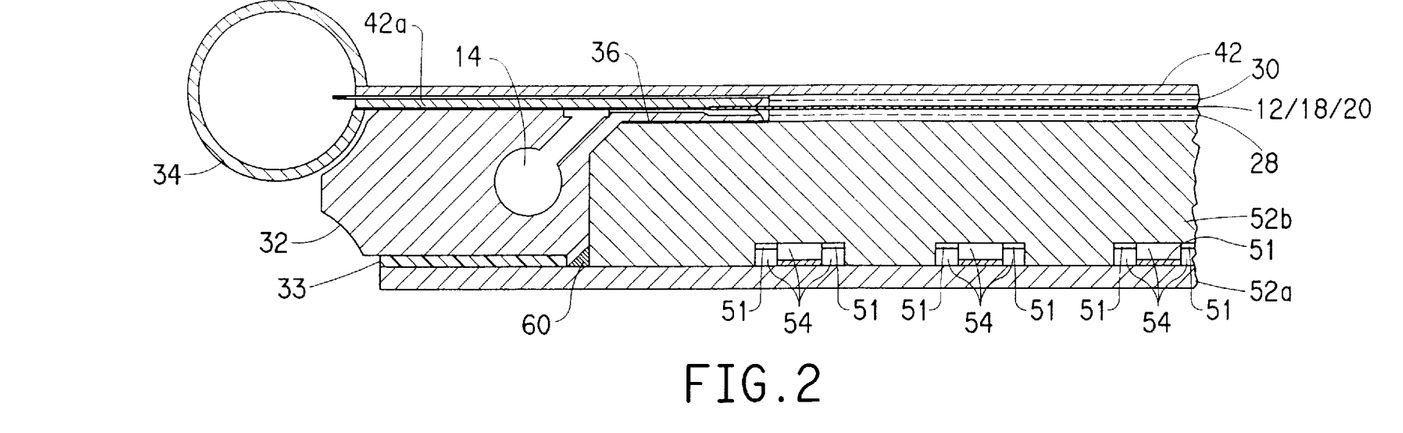
FIG. 2 is a portion of the cross-sectional view of a cell similar to that shown in FIG. 1, but with the anode and cathode manifolds constructed differently, showing an inflatable member according to the present invention.
Figure 3:
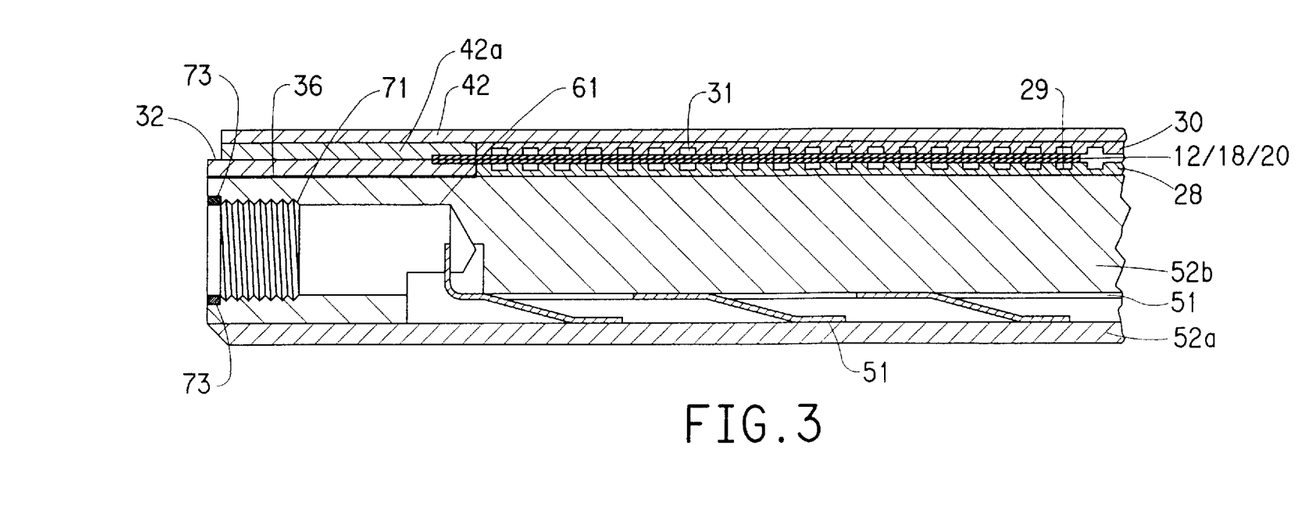
FIG. 3 is a cross-sectional view of a portion of the inflatable member as shown in FIG. 2, but rotated by 90° out of the plane of the paper.

The electrochemical cell of the first and second embodiments further comprises an anode mass flow field 28 disposed in contact with anode and a cathode mass flow field 30 as shown in FIGS. 1, 1A, 2 and 3 disposed in contact with the cathode. The mass flow fields are electrically conductive, and act as both mass and current flow fields. More specifically, the mass flow fields include a plurality of anode flow channels 29 and a plurality of cathode flow channels 31 as shown in FIGS. 1A and 3. The purpose of the anode flow field and flow channels 29 is to get reactants, such as anhydrous HCl to the anode and products, such as chlorine gas, from the anode. The purpose of the cathode flow field and flow channels 31 is to get catholyte, such as liquid water in the first embodiment or oxygen gas in the second embodiment, to the cathode through cathode-side inlet 24 and products, such as hydrogen gas in the first embodiment or water vapor in the second embodiment from the cathode through cathode-side outlet 26. Water vapor may be needed to keep the membrane hydrated. However, water vapor may not be necessary in the second embodiment because of the water produced by the electrochemical reaction of the oxygen ($O_2$) added as discussed below.

It is within the scope of the present invention that the mass flow fields and the flow channels may have a variety of configurations. Also, the mass flow fields may be made in any manner known to one skilled in the art. Preferably, the anode and the cathode mass flow fields comprise grooved, porous graphite paper, where the grooves form the channels. The flow fields may also be made of a porous carbon in the form of a foam, cloth or matte.

The electrochemical cell of the first and second embodiments may also comprise an anode mass flow manifold 32 and a cathode mass flow manifold 34 as shown in FIG. 1. The purpose of such manifolds is to bring products to and reactants from both the anode and the cathode, as well as to form a frame around the anode mass flow field and the anode and the cathode mass flow field and the cathode. These manifolds are preferably made of a corrosion resistant material, such as PFA. A gasket 36, 38 also contributes to forming a frame around the respective anode and cathode mass flow fields. These gaskets are preferably also made of a corrosion resistant material, such as PTFE.

The electrochemical cell of the first and second embodiments also comprises a current bus for conducting current to the electrode. Alternatively, the electro-chemical cell of the present invention may be described as comprising a current bus disposed on the other side of the oxidizing means for conducting current to oxidizing means. An anode current bus 46 and a cathode current bus 48 are shown in FIG. 1. Anode current bus 46 conducts current to any member shown to the right of current bus 46 as shown in FIG. 1, including anode 12. Cathode current bus 48 conducts current from any member shown to the left of current bus 48 in FIG. 1. The current buses conduct current from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the elements to the right of current bus 46 as shown in FIG. 1, including cathode current bus 48, from which it returns to the voltage source. The current buses are made of a conductor material, such as copper.

The electrochemical cell of the first and second embodiments further comprises a current distributor disposed in contact with the flow field. An anode current distributor 40 as shown in FIG. 1 is disposed in contact with anode flow field 28, and a cathode current distributor 42 as shown in FIG. 1 is disposed in contact with cathode flow field 30. The cathode current distributor is formed as a two-piece member 42 and 42a as shown in FIGS. 2 and 3. The anode current distributor collects current from the anode current bus and distributes it to the anode. The cathode current distributor collects current from the cathode and distributes it to the cathode bus. The anode and the cathode current distributors each comprise a non-porous layer. The anode current distributor provides a barrier between the anode current bus and the anode, as well as the anhydrous hydrogen halide, such as hydrogen chloride and the halogen gas, such as chlorine gas.

The cathode current distributor provides a barrier between the cathode current bus and the cathode, as well as the hydrogen halide. This is desirable because there is some migration of hydrogen halide through the membrane. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-base alloy, such as UNS10665, sold as HASTELLOY® B-2, by Haynes, International.

The electrochemical cell of the first and second embodiments also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. It should be noted that while structural support 44 is shown in front of anode current bus 46 in FIG. 1, it is within the scope of the present invention for the structural support to be placed behind the anode current bus (i.e., to the left of bus 46 as shown in FIG. 1) and still achieve the same results. The cathode current distributor acts as a corrosion-resistant structural backer on the cathode side. This piece can be drilled and tapped to accept the PFA fitting which is used for the inlet and outlet.

The electrochemical cell of the first and second embodiments also comprises a conductive inflatable member disposed between the electrode and the current bus for providing uniform electrical contact between the current bus and the electrode. Alternatively, the electrochemical cell of the first and second embodiments may be described as comprising inflatable means disposed between the oxidizing means and the current bus for providing uniform electrical contact between the current bus and the oxidizing means. Preferably, the inflatable means comprises an inflatable member. A conductive inflatable member is shown generally at 50 in FIG. 1, and comprises a plate 50a and a plate 50b. The inflatable member provides uniform pressure, and consequently uniform electrical contact, between the current bus and the electrode (in this case, the anode). A similar inflatable member is shown generally at 52 in FIG. 1 on the cathode side and comprises plates 52a and 52b. Inflatable member 52 also provides uniform pressure and thus uniform electrical contact between the current bus and the electrode (in this case, the cathode). It is possible to use only one inflatable member, on either side, although two are illustrated. In FIG. 1, inflatable member 50, which includes a channel 56, is shown between support 44 and bus 46, and inflatable member 52, which includes a channel 54, is shown between distributor 42 and bus 48. However, it should be noted that the inflatable member may be provided between support 44 and distributor 40, or between a separate support and current distributor on the cathode side, if such a configuration were to be used, without departing from the scope or spirit of the invention.

The plates of the inflatable member may comprise metal, or polyvinylidene fluoride, sold under the trademark KYNAR® by Elf Atochem North America, Inc. Fluoropolymers, which has been impregnated with graphite. Any material is suitable for the plates as long as it is sufficiently conductive and flexible. The plates must be conductive enough so that voltage drop across their faces does not adversely effect the chemistry of the cell, and so that electrical losses are acceptable. The plate or plates of the inflatable member must be flexible enough to accommodate any variations in manufacturing tolerances of the cell components and to flex with time as the cell components erode or corrode. Moreover, the plate or plates of the inflatable member must be sufficiently flexible to conform to variations in thickness and flatness of the components of the electrochemical cell.

It is preferable that the inflatable member of the first and second embodiments is conductive. If the inflatable member is conductive, it should be conductive enough so that the voltage drop across the face of the plates is essentially zero. However, it should be noted that the inflatable member of the present invention need not be conductive, if a different current bus design is used. Instead the inflatable member could be made of any non-porous, flexible material so that cooling fluid will not leak from it. Examples of such materials include rubber and nylon.

FIG. 2 is a cross-sectional view of the cathode-side inflatable member, showing a portion of FIG. 1, but with the anode and the cathode manifolds constructed differently than in FIG. 1. More specifically, in FIG. 1, the anolyte and the catholyte enter from the sides of the cell. In FIGS. 2 and 3, the anolyte and the catholyte enters from the ends, so that in FIGS. 2 and 3, gasket 38 is not necessary, although gasket 36 as shown in FIG. 2 is still needed. Although the inflatable member will be described with respect to the cathode side, it should be apparent that a corresponding configuration and thus a corresponding description applies to the anode side. The inflatable member on the cathode side comprises a pair of plates 52a and 52b as shown in FIG. 2 with a flow channel 54 disposed in between the plates for allowing cooling fluid to flow therein. Anode flow field 28 and cathode flow field 30 are shown by the dashed lines in FIG. 2. The inflatable member may have one relatively non-flexible plate and one flexible plate, which is usually thinner than the non-flexible plate. Thinner, flexible plate 52a as shown in FIGS. 1–3 pushes on the cathode side of the cell. The fluid in channel 54 between the plates, when pressurized, deflects plate 52b against the cathode side to provide uniform pressure over the entire face of the cathode. Plate 52a is sufficiently thin to easily deflect and conform to any variations in the other components. The design could be reversed so that plate 52b was thin and 52a was thick. In this case, plate 52a would deflect. Also, both plates could be thin and both would then deflect. The preferred design is to have one rigid and one flexible plate. This keeps the overall cell dimensions more constant and references all movement relative to the more rigid plate.

The space between the plates may be very small, just large enough to allow a fluid to enter between the plates, in the case where no heat dissipation is required. In theory, the gap can be zero since the fluid will create its own gap when it is pressurized, thus separating the plates. However, flow channels 54 and 56 may be used so that large quantities of fluid may be continuously pumped between the plates for cooling. This is very important if the cell reaction is exothermic, and/or if the cell is run at high current densities. However, it is important to note that flow channels 54 and 56 may not always be necessary if cooling is not needed.

Plates 52a and 52b are separated by optional spring clips 51 as shown in FIGS. 2 and 3, which allow the plates to move together and apart while maintaining the electrical contact therebetween. The spring clips are made of any electrically conductive material, such as beryllium. The edges of plates 52a and 52b are welded around the entire perimeter by a weld 60 so that the space between the plates can be pressurized with a fluid and thus flex in response thereto. Similarly, a weld 62 between anode-side plates 50a and 50b is shown in FIGS. 1, 5 and 6. Alternatively, they may be bolted or joined by any equivalent means that would prevent the fluid in between plate 52a and 52b from leaking. Anode mass flow manifold 32 and gasket 34 are shown in FIG. 2, with anode-side inlet 14 for bringing in the cell reactant, such as anhydrous hydrogen chloride. As illustrated in FIG. 2, a spacer 33 is provided between manifold 32 and plate 52a to push the parts of the cell which are shown in this Figure together.

FIG. 3 shows the cross-section of the portion of the cell shown in FIG. 2, but rotated 90° so that the flow channel can more easily be seen in the inflatable member. An inlet fitting 61 is shown in FIG. 3. Fitting 61 is threaded as shown at 71, and an O-ring seal, shown at 73 in FIG. 3, seals between the fitting and plate 52b. A cooling and pressure fluid enters the cell through fitting 61. Springs 51 extend up into the fitting and distribute the flow of cooling fluid into flow channels 54.

Figure 4:
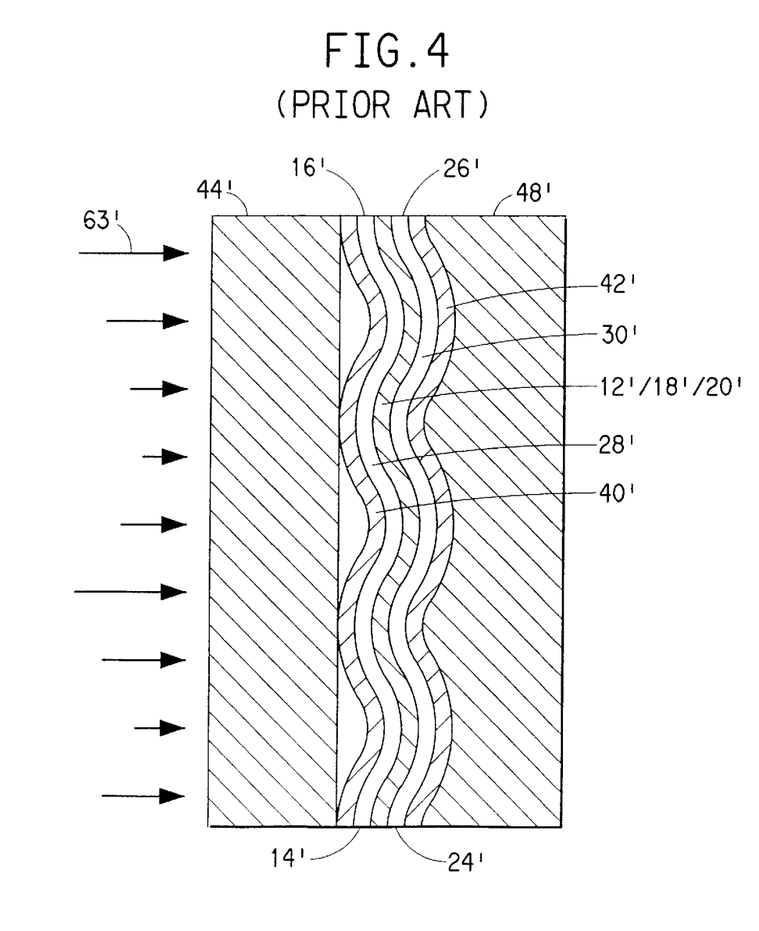
FIG. 4 is a cross-sectional view of a portion of a cell of the prior art, illustrating a pressure profile when no inflatable member is used.

FIG. 4 is a cross-sectional view of a portion of a cell of the prior art, illustrating a pressure profile when no inflatable member is used. In FIG. 4, elements (except the inflatable member) which correspond to the cell of the present invention are shown, but are designated with a prime. As can be seen from FIG. 4, an uneven pressure profile, as illustrated by arrows 63', results when no inflatable member is used. FIG. 5 is a cross-sectional view of a portion of an electrochemical cell according to the present invention, where the anolyte and catholyte enter from the sides of the cell. In FIG. 5, inflatable member 50 on the anode side of the cell is not inflated, and the deflections, which are usually on the order of tens of thousandths of an inch, are highly exaggerated. In particular, a gap 51, which is an air gap due to irregularities in the members of the cell, is shown in FIG. 5 between current distributor 40, which is integral with inflatable member 50b, and anode mass flow field 28. FIG. 6 shows the inflatable member of FIG. 5, this time inflated, illustrating how the inflatable member provides uniform contact pressure, as illustrated by arrows 63, which in turn provides uniform electrical contact, between the components of the cell. As can be seen from FIG. 6, there is no longer a gap between current distributor 40/plate 50b and anode mass flow field 28, due to the uniform contact pressure supplied by the inflatable member. An inlet 57 and an outlet 59 for pressurizing/cooling fluid are shown in FIGS. 5 and 6. The fluid inlet port for the cathode side of the cell is shown at 24 in FIGS. 5 and 6. The outlet ports for the anode and the cathode are not shown.

The fluid path for the inflatable member is totally sealed from the chemical components of the cell. Thus, a low cost cooling fluid (water is usually preferred) can be used to remove heat from the cell. Previously, before the present invention, an alternative to cool a cell was to use additional flow of fluid on the cathode or the anode. If, for example, additional water is used on the cathode to remove heat, the water becomes contaminated with HCl, and consequently, heat exchangers used in HCl environments must be designed for special servicing. This is expensive and in addition, results in large quantities of contaminated water that must be treated or disposed of. With the flow channels of the inflatable member of the present invention, pure water or other heat transfer fluid may be employed. Heat exchangers can be low in cost, and disposal and/or treatment of large quantities of liquids are eliminated. In addition, the cooling fluid is independent of the reactant and product flow. Anode flow and cathode flow can be optimum for the chemical balances desired, and the temperature of the cell can be controlled at any desired level by the flow and the temperature of the cooling fluid.

It will be apparent to those skilled in the art that various modifications and variations can be made in the inflatable member of the present invention and in the construction of this member without departing from the scope or spirit of the invention. As an example, although the inflatable member is shown as a separate, spaced element from the anode and cathode current distributor, it can be made integral with either the anode or the cathode current distributor. The former case, where the inflatable member is integral with the anode current distributor, is illustrated for the prior art in FIG. 5 and for the present invention in FIG. 6.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane other than NAFION® should be used.

The operation of the electrochemical cell for a first embodiment, where hydrogen, as well as chlorine gas, is produced by the cell, will now be described as it relates to a preferred embodiment of the process of the present invention, where the anhydrous hydrogen halide is hydrogen chloride. In operation, current flows to the anode bus, and anode current distributor 40 collects current from the anode bus and distributes it to the anode by electronic conduction. Anode-side inflatable member 50 maintains uniform electrical contact between the anode current bus, such as bus 46, and all the elements to the right of the bus as shown in FIG. 1, up to and including the anode. Molecules of essentially anhydrous hydrogen chloride gas are fed through anode-side inlet 14 and through flow channels 29 in anode mass flow field 28 and are transported to the surface of anode 12. The molecules are oxidized at the anode under the potential created by the voltage source to produce essentially dry chlorine gas (Cl$_2$(g)) at the anode, and protons (H$^+$) as shown in FIG. 1. This reaction is given by the equation:

(4)

The chlorine gas (Cl$_2$(g)) exits through anode-side outlet 16 as shown in FIG. 1. The protons (H$^+$) are transported through the membrane, which acts as an electrolyte. The transported protons are reduced at the cathode. This reaction for the first embodiment is given by the equation:

(5)

Water is delivered to the cathode through inlet 24 and through flow channels 31 in the cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode bus 46. Cathode-side inflatable member 52 maintains uniform electrical contact between the cathode current bus, such as bus 48, and all the elements to the left of 48 as shown in FIG. 1 up to and including the cathode.

The operation of the electrochemical cell of the second embodiment will now be described as it relates to a preferred embodiment of the process of the present invention, where the anhydrous hydrogen halide is hydrogen chloride. In operation, current flows to the anode bus, and anode current distributor collects current from the anode bus and distributes it to the anode by electronic conduction. Molecules of essentially anhydrous hydrogen chloride are fed to anode-side inlet 14 and are transported through flow channels 29 of anode mass flow field 28 to the surface of anode 12. An oxygen-containing gas, such as oxygen (O$_2$(g), air or oxygen-enriched air (i.e., greater than 21 mol % oxygen in nitrogen) is introduced through cathode-side inlet 24 and through flow channels 31 formed in cathode mass flow field 30. Although air is cheaper to use, cell performance is enhanced when enriched air or oxygen is used. This cathode feed gas may be humidified to aid in the control of moisture in the membrane. Molecules of the hydrogen chloride (HCl (g)) are oxidized under the potential created by the voltage source to produce essentially dry chlorine gas at the anode and protons (H$^+$), as expressed in equation (4) above. The chlorine gas (Cl$_2$) exits through anode-side outlet 16 as shown in FIG. 1. The protons (H$^+$) are transported through the membrane, which acts as an electrolyte. The current is distributed to the cathode by electronic conduction, and current flows to cathode current bus 48 from cathode current distributor 42. Oxygen and the transported protons are reduced at the cathode to water, which is expressed by the equation:

$$\tfrac{1}{2}O_2(g)+2e^-+2H^+\rightarrow H_2O(g) \qquad (6)$$

The water formed (H$_2$O(g) in equation (6)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 48.

In this second embodiment, the cathode reaction is the formation of water. This cathode reaction has the advantage of more favorable thermodynamics relative to H$_2$ production at the cathode as in the first embodiment. This is because the overall reaction in this embodiment, which is expressed by the following equation:

(7)

involves a smaller free-energy change than the free-energy change for the overall reaction in the first embodiment, which is expressed by the following equation:

(8)

Thus, the amount of voltage or energy required as input to the cell is reduced in this second embodiment.

The process of either the first or second embodiment also includes the step of hydrating the cathode side of the membrane moist to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (6) above and by the water introduced in a humidified oxygen-feed or air-feed stream. This keeps the conductivity of the membrane high.

In either of the first or second embodiments, the electrochemical cell can be operated over a wide range of temperatures. Room temperature operation is an advantage, due to the ease of use of the cell. However, limits on temperature occur because of the properties of the materials used for elements of the cell. Higher temperatures result in lower cell voltages. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

It should be noted also that one is not restricted to operate the electrochemical cell of either the first or the second embodiment at atmospheric pressure. The cell could be run at differential pressure gradients, which change the transport characteristics of water or other components in the cell, including the membrane.

Figure 7:
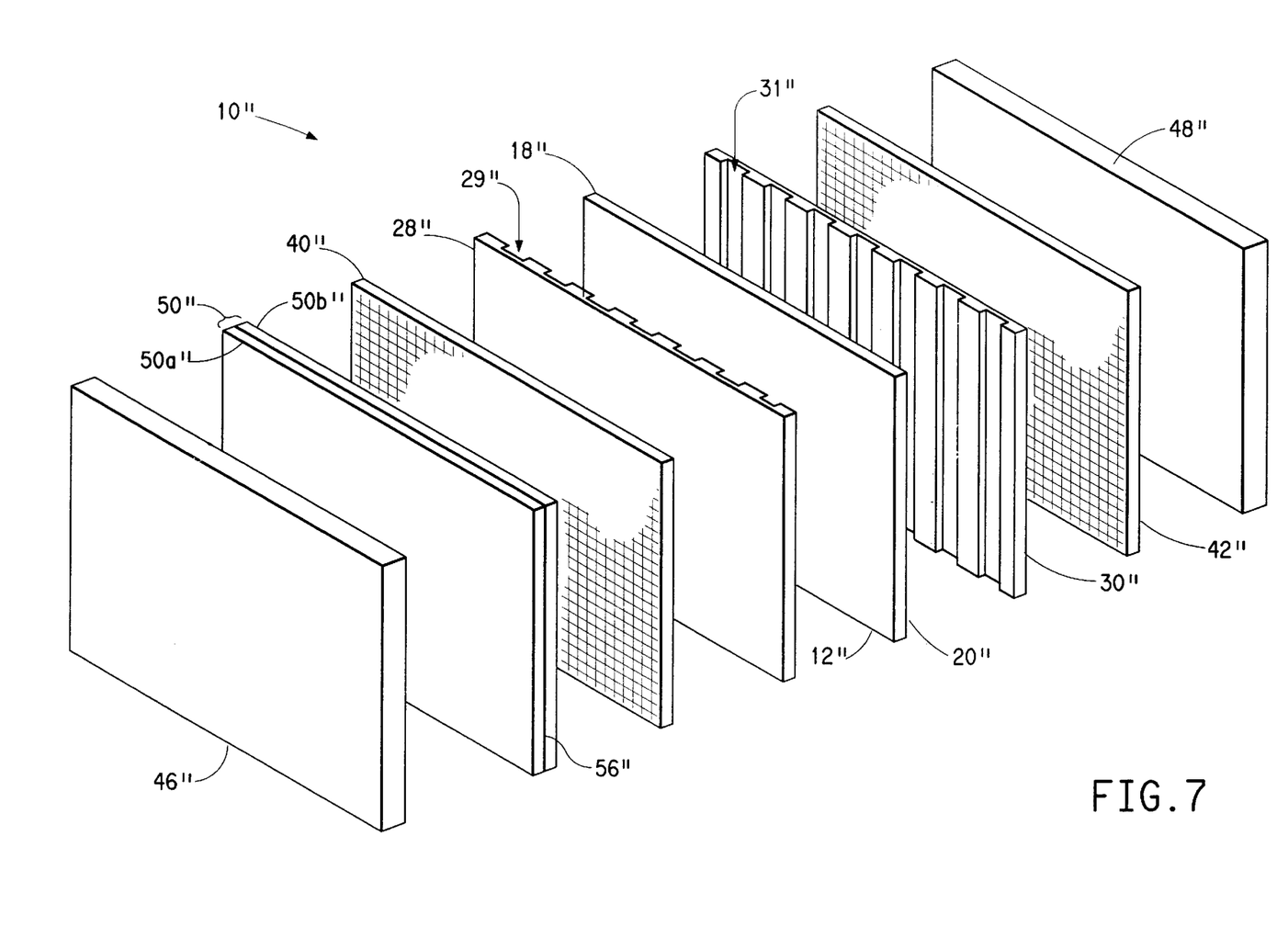
FIG. 7 is a perspective view of an electrochemical cell for producing halogen gas from aqueous hydrogen halide according to a third embodiment of the present invention.

FIG. 7 illustrates a third embodiment of the present invention. Wherever possible, elements corresponding to the elements of the embodiment of FIGS. 1–6 will be shown with the same reference numeral as in FIGS. 1–6, but will be designated with a double prime ("). An electrochemical cell of the third embodiment is shown generally at 10" in FIG. 7. The electrochemical cell of the third embodiment will be described with respect to a preferred embodiment, where halogens, such as chlorine, are generated by the electrolysis of an aqueous solution of a hydrogen halide, such as hydrochloric acid. One could also use this cell for other uses, for instance, in a chloralkali system, with brine and hydrochloric acid.

The electrochemical cell of the third embodiment comprises an electrode, or more specifically, an anode 12". The electrochemical cell of the third embodiment also comprises a membrane disposed in contact with one side of the electrode. A membrane 18" is shown in FIG. 7 having one side disposed in contact with one side of anode 12". Unlike the membrane in the first embodiment, the membrane of the third embodiment need not necessarily be a cation-transporting membrane. The electrochemical cell of the third embodiment also comprises an electrode, or more specifically, a cathode 20", where cathode 20" is disposed in contact with the other side (as opposed to the side which is in contact with the anode) of the membrane as illustrated in FIG. 7.

The electrochemical cell of the third embodiment also comprises a current bus for conducting current to the electrode, where the current bus is disposed on the other side of the electrode. An anode current bus 46" and a cathode current bus 48" are shown in FIG. 7. The current buses conduct current from a voltage source (not shown). Specifically, anode current bus 46" is connected to the positive terminal of a voltage source, and cathode current bus 48" is connected to the negative terminal of the voltage source, so that when voltage is supplied to the cell, current flows from the voltage source through anode current bus 46" to and from anode 12" and membrane 18' and returns to the voltage source by flowing to and from cathode 20" and through cathode current bus 48". The current buses are made of a conductor material, such as copper.

The electrochemical cell of the third embodiment of the present invention further comprises a mass flow field disposed in contact with the electrode. The mass flow field may be an anode mass flow field 28" disposed in contact with the anode, or a cathode mass flow field 30" disposed in contact with the cathode. The mass flow fields act as both mass and current flow fields. Mass flow fields 28" and 30" include flow channels 29" and 31" as shown in FIG. 7. The purpose of anode flow field 28" and flow channels 29" is to get reactants, such as aqueous HCl through an anode-side inlet (not shown) disposed in fluid communication with channels 29" to the anode and products, such as wet chlorine gas, from the anode through an anode-side outlet (not show), also disposed in fluid communication with channels 29". The purpose of cathode flow field 30" and flow channels 31" is to get catholyte to the cathode through a cathode-side inlet (not shown) disposed in fluid communication with channels 31" and products through cathode-side outlet (not shown), also disposed in fluid communication with channels 31".

The electrochemical cell of the third embodiment further comprises a current distributor disposed in contact with the flow field. As shown in FIG. 7, an anode current distributor 40" is disposed in contact with anode flow field 28", and a cathode current distributor 42" is disposed in contact with cathode flow field 30". As in the first two embodiments, the anode current distributor collects current from the anode and distributes it to the anode bus. The cathode current distributor collects current from the cathode and distributes it to the cathode bus. The anode and the cathode current distributors each comprise a non-porous layer. The anode current distributor provides a barrier between the anode and the anode current bus, as well as between the anode current bus and the reactant, such as aqueous hydrogen chloride and the product, such as wet chlorine gas. The cathode current distributor provides a barrier between the cathode and the cathode current bus, as well as between the catholyte and the cathode current bus. The current distributors of third embodiment may be made of a variety of materials, and the material used for the anode current distributor need not be the same as the material used for the cathode current distributor.

The electrochemical cell of the third embodiment also comprises an inflatable member 50" disposed between the electrode and the current bus. Inflatable member 50" includes a pair of plates 50a" and 50b" as shown in FIG. 7 with a flow channel 56" for providing cooling fluid to the cell. In addition, or alternatively, a cathode-side inflatable member (not shown) may be provided in the third embodiment. The construction and configuration of the inflatable member of the third embodiment is the same as that described above with respect to FIGS. 1–3, 5 and 6 for the first two embodiments.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid is delivered to anode flow field 28" by an anode-side inlet through channels 29" formed in anode flow field 28" and is electrolyzed at anode 12" to produce gaseous chlorine, which exits the flow field from an anode-side outlet, and hydrogen ions (H⁺). The H⁺ ions are transported across membrane 18" to cathode 20" along with some water and some hydrochloric acid. The hydrogen ions, along with the water or hydrochloric acid which is pumped across membrane 18", are discharged from the cathode-side of the cell through channels 31" formed in cathode flow field 30" and through the cathode-side outlet.

Additional advantages and modifications will readily occur to those skilled in the art. The invention, in its broader aspects, is, therefore, not limited to the specific details and representative apparatus shown and described. Accordingly, departures may be made from such details without departing from the spirit or scope of the general inventive concept as defined by the appended claims and their equivalents.

What is claimed is:

1. An electrochemical cell, comprising:
   (a) an electrode;
   (b) a membrane disposed in contact with one side of the electrode;
   (c) a current bus for conducting current to the electrode, wherein the current bus is disposed on the other side of the electrode; and
   (d) a conductive inflatable member disposed between the electrode and the current bus, wherein the inflatable member provides uniform electrical contact between the electrode and the current bus.

2. The electrochemical cell of claim 1, wherein the electrode is an anode, and the inflatable member is disposed between the anode and the current bus.

3. The electrochemical cell of claim 1, wherein the electrode is a cathode, and the inflatable member is disposed between the cathode and the current bus.

4. The electrochemical cell of claim 1, further including a current distributor disposed between the membrane and the current bus, wherein the inflatable member is disposed between the current distributor and the current bus for providing uniform contact between the electrode, and the current bus through the current distributor, wherein the inflatable member comprises a pair of flexible plates, and one plate is thinner than the other plate.

5. The electrochemical cell of claim 4, wherein the edges of the plates are welded together.

6. The electrochemical cell of claim 4, wherein the flexible plates comprise metal.

7. The electrochemical cell of claim 4, wherein the flexible plates comprise polyvinylidene fluoride impregnated with graphite.

8. The electrochemical cell of claim 4, further including a flow channel disposed in between the plates for providing a path for cooling fluid.

9. The electrochemical cell of claim 4, wherein the inflatable member is integral with the current distributor.

10. An electrochemical cell for directly producing essentially dry halogen gas from essentially anhydrous hydrogen halide, comprising:
    (a) means for oxidizing molecules of essentially anhydrous hydrogen halide to produce essentially dry halogen gas and protons;
    (b) cation-transporting means for transporting the protons therethrough, wherein one side of the cation-transporting means is disposed in contact with one side of the oxidizing means;
    (c) means for reducing the transported protons, wherein the other side of the cation-transporting means is disposed in contact with the reducing means;
    (d) a current bus disposed on the other side of the oxidizing means for conducting current to the oxidizing means; and
    (e) inflatable means disposed between the oxidizing means and the current bus for providing uniform electrical contact between the current bus and the oxidizing means.

11. The electrochemical cell of claim 10, wherein the oxidizing means is an anode, the cation-transporting means is a membrane, the reducing means is an electrode, and the inflatable means is an inflatable member.

12. The electrochemical cell of claim 11, further including an inlet disposed at the cathode-side of the membrane.

13. The electrochemical cell of claim 12, further including an anode mass flow field disposed in contact with the anode, and a cathode mass flow field disposed in contact with the cathode.

14. The electrochemical cell of claim 13, wherein the anode and the cathode mass flow fields have flow channels formed therein, and the flow channels of the cathode mass flow field are disposed in fluid communication with the inlet, and further wherein the flow channels of the anode mass flow field and the flow channels of the cathode mass flow field are parallel to each other.

15. The electrochemical cell of claim 14, wherein the flow channels of the anode mass flow field and of the cathode mass flow field are both vertical.

16. The electrochemical cell of claim 14, wherein the inflatable member comprises a pair of flexible plates.

17. The electrochemical cell of claim 16, wherein one plate is thinner than the other.

18. The electrochemical cell of claim 16, further including a cooling channel provided in between the plates for providing a path for cooling fluid.

19. The electrochemical cell of claim 14, wherein the inflatable member is disposed between the anode current distributor and the current bus for providing uniform contact between the current bus and the anode through the anode current distributor and the anode flow field.

20. The electrochemical cell of claim 14, further including a cathode current distributor having one side disposed in contact with the cathode flow field and a cathode current bus disposed on the other side of the cathode current distributor.

21. The electrochemical cell of claim 20, further including a cathode-side inflatable member disposed between the cathode current distributor and the cathode current bus for providing uniform contact between the cathode current bus and the cathode through the cathode current distributor and the cathode flow field.

22. The electrochemical cell of claim 14, wherein each of the anode and the cathode comprise an electrochemically active material.

23. The electrochemical cell of claim 22, wherein the anode and the cathode are gas diffusion electrodes.

24. The electrochemical cell of claim 23, wherein the catalyst loading of the electrochemically active material is in the range of 0.10 to 0.50 mg/cm².

25. The electrochemical cell of claim 24, wherein the cation-transporting membrane is a proton-transporting membrane.

26. The electrochemical cell of claim 25, wherein the proton-transporting membrane comprises a copolymer of tetrafluoroethylene and poly-sulfonyl fluoride vinyl ether containing pendant sulfonic acid groups.

27. The electrochemical cell of claim 26, wherein the electrochemically active material of the anode and the cathode is platinum.

28. The electrochemical cell of claim 26, wherein the electrochemically active material of the anode is ruthenium oxide.

29. The electrochemical cell of claim 28, wherein electrochemically active material of the cathode is platinum.

30. The electrochemically cell of claim 22, wherein the electrochemically active material comprises one of the following: platinum, ruthenium, osmium, rhenium, rhodium, iridium, palladium, gold, titanium and zirconium, and the oxides, alloys and mixtures thereof.

31. The electrochemical cell of claim 30, wherein the electrochemically active material is applied as a film from ink onto the membrane.

32. The electrochemical cell of claim 31, wherein the loading of the electrochemically active material is at least about 0.017 mg/cm$^2$.

33. The electrochemical cell of claim 22, wherein the electrochemically active material is bonded to a support structure.

34. The electrochemical cell of claim 33, wherein the support structure comprises carbon paper.

35. The electrochemical cell of claim 33, wherein the support structure comprises graphite cloth.

36. The electrochemical cell of claim 33, wherein the electrochemically active material comprises a catalyst material on a support material.

37. The electrochemical cell of claim 36, wherein the support material comprises particles of carbon and particles of polytetrafluoroethylene.

38. The electrochemical cell of claim 37, wherein the electrochemically active material is bonded by the particles of polytetrafluoroethylene to the support structure.

* * * * *

UNITED STATES PATENT AND TRADEMARK OFFICE
CERTIFICATE OF CORRECTION

PATENT NO. : 5,824,199
DATED : October 20, 1998
INVENTOR(S) : Simmons et al.

It is certified that error appears in the above-identified patent and that said Letters Patent is hereby corrected as shown below:

Column 6, line 62, in place of "polytetrafluoroethylene" should appear -- tetrafluoroethylene --.

Column 6, line 63, in place of "poly-sulfonyl fluoride vinyl ether-containing" should appear -- perfluoro vinyl ether-containing --.

IN THE CLAIMS:

Claim 26, line 3, in place of "poly-sulfonyl fluoride vinyl ether" should appear -- perfluoro vinyl ether --.

Signed and Sealed this

Thirteenth Day of April, 1999

*Attest:*

Q. TODD DICKINSON

*Attesting Officer*     Acting Commissioner of Patents and Trademarks